United States Patent

[11] 3,618,093

| [72] | Inventor | Frank R. Dickey, Jr<br>Dewitt, N.Y. |
|---|---|---|
| [21] | Appl. No. | 265,598 |
| [22] | Filed | Mar. 14, 1963 |
| [45] | Patented | Nov. 2, 1971 |
| [73] | Assignee | The United States of America as represented by the Secretary of the Army |

[54] OBSTACLE DETECTION RADAR SYSTEM
9 Claims, 5 Drawing Figs.

[52] U.S. Cl.......................................... 343/17.1 R,
343/7.7, 343/165 D, 343/113 R
[51] Int. Cl........................................ G01s 9/06,
G01s 9/22, G01s 9/42
[50] Field of Search........................... 343/16.1,
16, 7.7, 113, 17.1

[56] References Cited
UNITED STATES PATENTS

| 2,456,666 | 12/1948 | Agate et al................ | 343/16 |
| 3,025,517 | 3/1962 | Watson et al............... | 343/16.1 |
| 3,064,253 | 11/1962 | Kirkpatrick................ | 343/16.1 |
| 3,064,254 | 11/1962 | Dickey, Jr................. | 343/16.1 |
| 3,078,453 | 2/1963 | McGillem et al........... | 343/16.1 |
| 3,090,951 | 5/1963 | Mieher...................... | 343/16.1 |

*Primary Examiner*—Malcolm F. Hubler
*Attorneys*—Harry M. Saragovitz and Julian C. Keppler CLAIM: 4. A radar receiver comprising: an antenna having two vertically displaced feeds; a hybrid tee having a first input connected one of said feeds, a second input connected to the other of said feeds, and two outputs, a 90° shifter coupled to one of said hybrid tee outputs; a first mixer coupled to said phase shifter; a second mixer coupled to the other of said hybrid tee outputs; a local oscillator coupled to said first and second mixers; a first subtractor coupled to said first and second mixers; an adder coupled to said first and second mixers; a first IF amplifier coupled to said first subtractor; a second IF amplifier coupled to said adder; a first rectifier coupled to said first IF amplifier; a second rectifier coupled to said second IF amplifier; and a second subtractor coupled to said first and second rectifiers.

INVENTOR,
FRANK R. DICKEY, JR.

BY Harry M. Saragovitz

ATTORNEY.

OBSTACLE DETECTION RADAR SYSTEM

This invention relates to an obstacle detection system, and more particularly to a radar system for the detection of elevated objects.

My radar system operates in such a manner that it responds to signals from objects elevated above the surrounding level terrain while it cancels the signals from the level terrain. The system can be used as a ground radar system or as an airborne system. Of course, there are various types of ground and airborne radar systems known in the art. One such system is a moving target indicator (MTI) radar system. My radar system has distinct advantages over prior art radar systems such as the MTI system. For example, the circuitry required in my radar system is much simpler than that required in an MTI system since delay lines are not used in my system. In addition, there is no limitation on scanning speed and when my system is used as an airborne radar, the motion of the aircraft has no effect on its operation; whereas, MTI radar systems are limited in scanning speed and airborne MTI radars are adversely effected by the motion of the aircraft.

In its simplest form my invention utilizes two receiving antennas. One of these two antennas can also be used as the transmitting antenna. The transmitting antenna is pulsed in such a way that short pulses of radio frequency energy are emitted at regular intervals. During the interval between successive pulses, echo signals are received on each of the two antennas. These signals are heterodyned to an intermediate frequency and amplified in two identical receivers. The outputs of the two receivers are rectified and then one rectified signal is subtract from the other rectified signal. The residue from the subtractor is full wave rectified and displayed on an indicator, which may be of the PPI type, for example. If the echoes received by the two antennas have the same vertical angle of arrival, the output of the subtractor circuit will be zero. On the hand, when the received signal at a given instant consists of waves having two different vertical angles of arrival, the output of the subtractor will not be zero. Echoes from a level terrain will arrive at the antennas with the same vertical angles, whereas, echoes from the terrain and from objects elevated above the terrain will arrive at the antennas with different vertical angles. Thus, the output from the subtractor circuit gives an indication of elevated objects.

An object of my invention is to provide an obstacle detection radar system.

Another object of my invention is to provide a ground radar system.

A further object of my invention is to provide an airborne radar system.

A still further object of my invention is to provide an airborne radar system that is not adversely effected by motion of the aircraft.

An additional object of my invention is to provide obstacle detection radar system that affords rapid scanning and has a relatively simple circuit structure.

The above mentioned and other objects of the invention will be more clearly understood from the following description and accompanying drawings in which corresponding elements in the various figures have the same reference numbers and in which.

The method of operation of my obstacle detection radar system is closely related to the effect which causes lack of cancellation with an airborne MTI radar when looking toward the side and traveling at high speed. In the MTI case, the antenna is displaced horizontally by the motion of the aircraft. This displacement changes the relative phases of the signals from various targets and, as a result, produces a change in amplitude of the net signal. The various signals which combine usually come from points scattered throughout the beam in azimuth. In fact, if they should, in a particular case, happen to come from a small azimuth sector, then the displacement would produce very little effect on the amplitude. In the MTI case, the displacement occurs between successive pulses; whereas, I obtain the effect on each pulse by using two antennas, one placed above the other or by using a two-feed antenna with the phase centers displaced from each other vertically. A more direct analogy to the MTI case would be two antennas side by side or a two-feed antenna with the phase centers displaced from each other horizontally. As was stated above, in MTI radars a small azimuth sector produces very little effect on the amplitude of the signal. By vertically displacing the antennas or phase centers, I obtain cancellation of signals from targets that are vertically concentrated while signals from targets that are vertically dispersed do not cancel.

Figure 1:
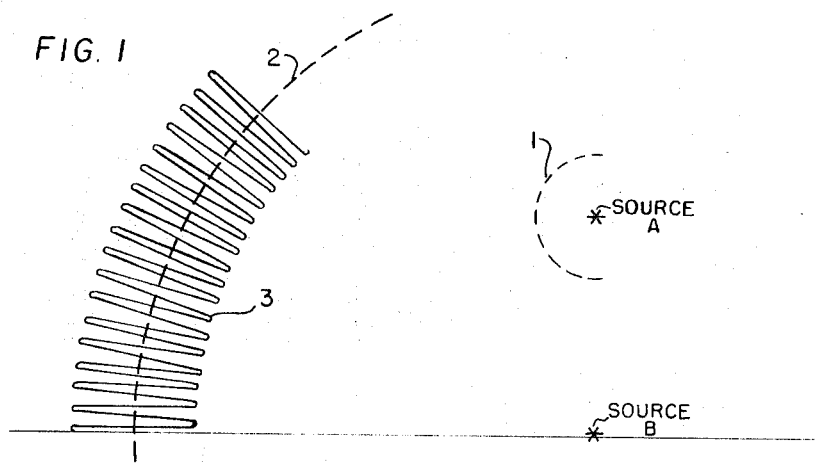
FIG. 1 is a signal diagram useful in describing the operation of my invention.

The above discussion can probably be better understood by considering two targets at the same range each reradiating the incident radar signal. As indicated in FIG. 1, this situation may be idealized by assuming each target to be a point source. Source A is an object elevated above the ground and source B is the ground. The dash line arcs 1 and 2 indicate the relative intensity of sources A and B respectively. As is apparent from FIG. 1 the signal from ground source B is considerably stronger than the signal from elevated source A. The two sources interfere with each other and, since they are a large number of wavelengths apart, the combined intensity pattern has minima and maxima which are close together as is indicated at 3 in FIG. 1. If two receiving antennas are located one above the other, it may be seen, from FIG. 1, that with the two sources present, the two antennas are likely to see different intensities; whereas, with only one signal present, the two antennas will see the same intensity. The situation depicted in FIG. 1 is idealized; however, the theory of operation in an actual situation is the same.

From the discussion above, it is apparent that the distance between maxima and minima of the interferences pattern is related to the vertical displacement of the targets. If the targets are far apart, the maxima and minima are close together. If the targets are close together the maxima and minima are farther apart. Thus, from a practical viewpoint, it that only those targets that are located well above the ground can be detected by my invention. If two antennas are used in a ground radar system, the two antennas can be separated a considerable distance. With the antennas widely separated, objects that are only slightly elevated above the terrain can be easily detected. However, if one antenna will with vertically displaced phase centers or if two antennas are used in an airborne system, the separation between the antennas or phase centers is obviously small. It would appear then that only objects elevated well above the terrain can be detected with my radar system when a single antenna is used or when my system is used as an airborne radar.

Improper separation of the antennas does not completely negate detection. Decreasing the antenna separation merely decreases the sensitivity of the system. If the echo signals from objects elevated only slightly above the terrain are strong, then the combined signal strength of the ground return and object return signals will offset the decreased sensitivity. When both return signals are strong, the intensity of the interference pattern will be greater than interference pattern 3 shown in FIG. 1 and the two antennas spaced closely together will receive signals of different amplitude. Fortunately, objects, such as mountains and buildings; that are not elevated very far above the surrounding terrain normally give very strong echo signals; therefore, these objects can be detected; even though, the sensitivity of the system has been decreased due to decreased antenna separation.

Figure 2:
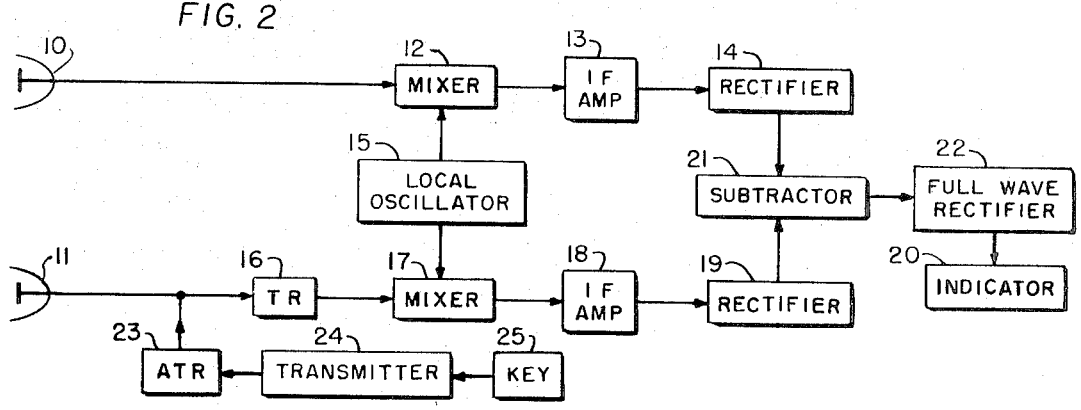
FIG. 2 is a block diagram of one embodiment of my invention.
Figure 3:
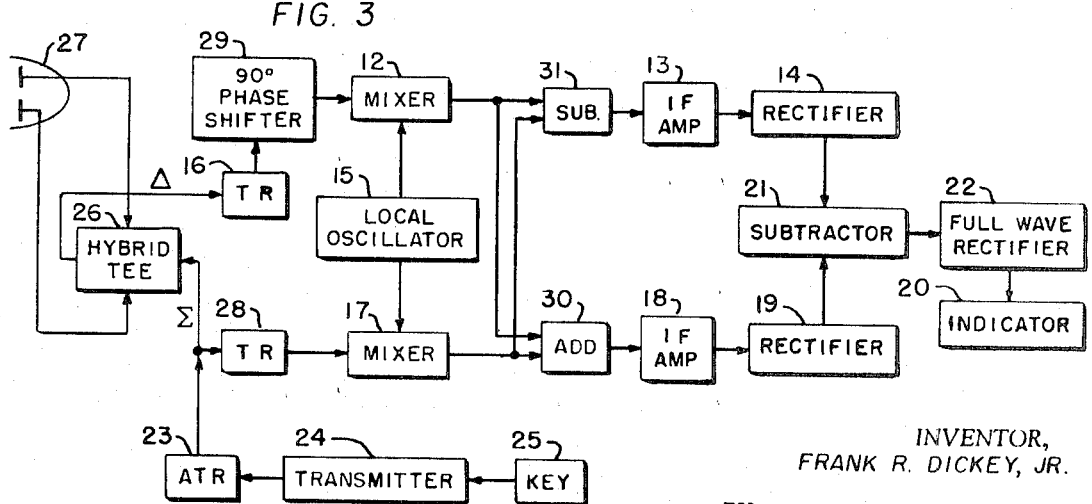
FIG. 3 is a block diagram of a second embodiment of my invention.
Figure 4:
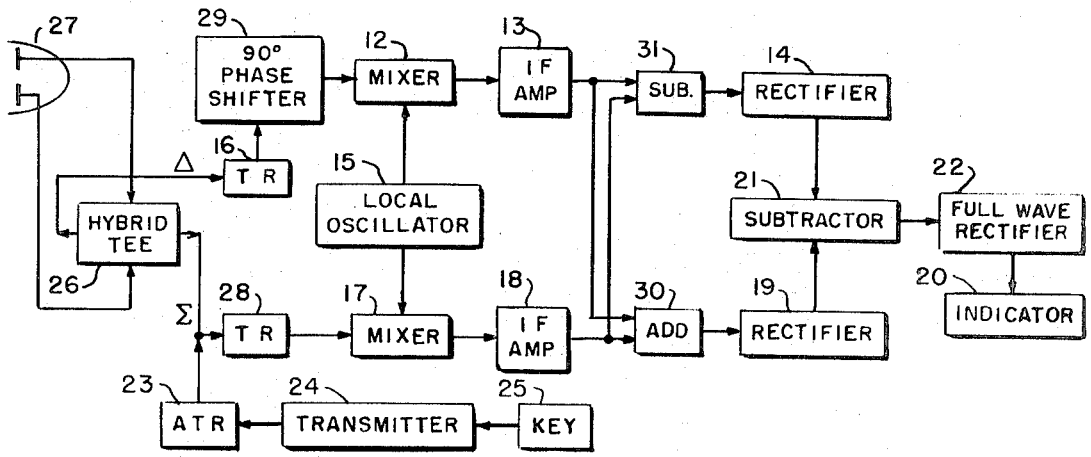
FIG. 4 is a block diagram of a third embodiment.

FIGS. 2, 3 and 4 show three possible circuits for detecting the above-discussed effect. In FIG. 2 two antennas 10 and 11 are used. Antenna 11 also serves as the transmitting antenna.

One could, of course, provide a separate transmitting antenna in which case the ATR unit 23 and TR unit 16 would not be required. These units are standard TR and ATR units. Transmitter 24 is turned "on" and "off" by keyer 25 in such a way that short pulses of radio frequency energy are emitted at regular intervals. During the intervals between transmissions, signals are received on each of the antennas 10 and 11. The signals received by antenna 10 are applied to mixer 12 where they are heterodyned with signals from local oscillator 15. The output from mixer 12 is amplified by IF amplifier 13 and then rectified by rectifier 14. The signals received by antenna 11 are applied to mixer 17 where they are also heterodyned with the signals from oscillator 15. The output from mixer 17 is amplified by IF amplifier 18 and then rectified by rectifier 19.

The outputs of rectifiers 14 and 19 are applied to subtractor 21. Subtractor 21 subtracts one signal from the other and the residue from subtractor 21 is full wave rectified by rectifier 22. The output from rectifier 22 is displayed on indicator 20, which may be a PPI type of indicator, for example. The output from subtractor 21 is zero when the signals received by antennas 10 and 11 are from level ground and is some value greater or less than zero when some of the signals received by antennas 10 and 11 are echoes from an object elevated above the terrain. Since the output of subtractor 21 can be positive or negative, full wave rectification of the subtractor output is necessary.

The fact that subtractor 21 will cancel the signals from level terrain and will not cancel the signals from an elevated obstacle is apparent from FIG. 1. In the above discussion of FIG. 1 it was pointed out that the interference pattern 3 resulting from signals 1 and 2 of sources A and B respectively has well-defined maxima and minima. With antenna 10 placed above antenna 11 the amplitude of the signals received by the two antennas will be different. If the amplitude of the signals received by antennas 10 and 11 are different, then the outputs of rectifiers 14 and 19 will also be different in amplitude. This amplitude difference is detected by subtractor 21 and shows up on indicator 20. The only other condition that is necessary to obtain the desired results is that signals appearing on each antenna must be amplified equally before they are applied to the subtractor. This condition is met by using two identical receivers.

Figure 5:
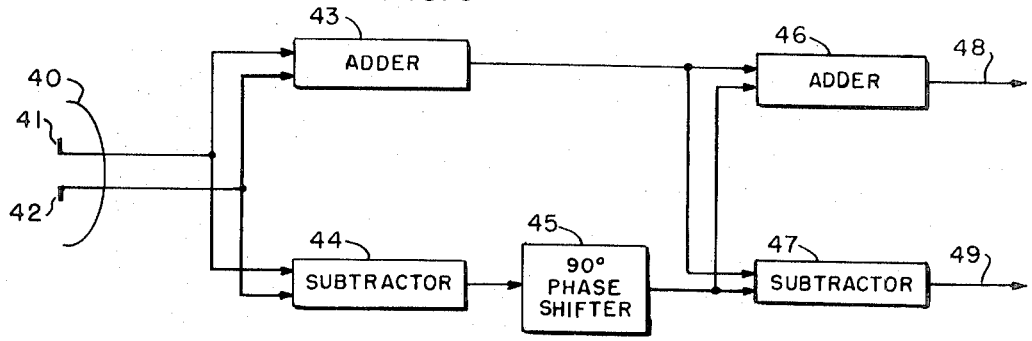
FIG. 5 shows, in block diagram form, circuit structure common to both FIGS. 3 and 4.

FIGS. 3 and 4 show two other embodiments of my invention. These two embodiments each use a single antenna 27 having two feeds. Such an antenna is called an amplitude comparison monopulse antenna and is well known. The circuits of FIGS. 3 and 4 are based on a well-known principle which is illustrated in FIG. 5. Antenna 40 has two feeds 41 and 42. The signals appearing on both these feeds are applied to subtractor 44 and adder 43. The output of subtractor 44 is phase shifted 90° by phase shifter 45. The outputs of adder 43 and phase shifter 45 are both applied to adder 46 and to subtractor 47. The process of adding and subtracting, producing a 90° phase shift and then adding and subtracting again has the effect of converting amplitude monopulse antenna 40 into a phase monopulse antenna. That is, as far as can be determined by measurements at output terminals 48 and 49, the circuit shown in FIG. 5 is equivalent to two separate antennas having identical directivity patterns but having a displacement between their phase centers or their effective locations in space. The mathematical principles involved in this transformation are described in the book, "Introduction to Monopulse," by Donald R. Rhodes, McGraw-Hill, 1959, and in particular, chapter 3 of that book.

The circuit of FIG. 5 is basic to the operation of the systems shown in FIGS. 3 and 4. In both systems the first sum and difference function is performed at the radio frequency level by means of a hybrid tee 26. The second sum and difference function is performed in each case at the intermediate frequency level. In the circuit of FIG. 3 the subtractor 31 and the adder 30 are located ahead of IF amplifiers 13 and 18 respectively. In the circuit of FIG. 4 the subtractor 31 and adder 30 are located after IF amplifiers 13 and 18 respectively. This difference in placement of subtractor 31 and adder 30 in FIGS. 3 and 4 is significant, in that the IF amplifiers of FIG. 3 must be matched in regard to their gain characteristics, but not in regard to their phase characteristics, while in the system of FIG. 4 the IF amplifiers must be matched in regard to their phase characteristics, but not in regard to their gain characteristics. In this respect, the system of FIG. 3 is similar to the system of FIG. 2, where the IF amplifiers must also be matched in regard to their gain characteristics. The differences in phase characteristics of the two IF amplifiers in the systems of FIGS. 2 and 3 has no effect on the end result because their outputs are simply rectified. However, it is apparent that the gain characteristics of the two IF amplifiers in the systems of FIGS. 2 and 3 must be matched if the echo signals from a flat terrain are to be suppressed by the subtraction process.

The matched phase characteristic requirement of the IF amplifiers in the system of FIG. 4 can best be explained by considering a slight generalization of the circuit shown in FIG. 5. If 90° phase shifter 45 is replaced by a circuit element that not only shifts the phase by 90° but also either increases or decreases the signal level in one channel, then the net effect is to change the effective phase centers of the antenna feeds 41 and 42. On the other hand if the circuit element produces a phase shift which is different from 90°, then the effect is to make the two directivity patterns different. In the system of FIG. 4, the circuit elements that produces a phase shift different from 90° are the IF amplifiers. Thus, the effect of a gain change is relatively unimportant, while the effect of a phase change is important.

In FIGS. 3 and 4 subtractor 31, adder 30, rectifier 14, subtractor 21, and rectifier 19 could be replaced by a single box labeled "phase comparator." A phase comparator performs the function of taking the sum and difference of two voltages, then rectifying the resultant voltage and again taking the difference. In FIG. 3, the IF amplifiers would also be included in the box labeled "phase comparator."

The difference between the IF amplifier requirements in FIGS. 3 and 4 can best be understood if the above discussion of FIG. 5 is recalled. In describing FIG. 5 it was pointed out that the effect of adding, subtracting, phase shifting and then adding and subtracting again is to convert the amplitude monopulse antenna to a phase monopulse antenna. This process is complete at the outputs of the second subtractor and adder circuits, not before this point. If IF amplifiers 13 and 18 in FIG. 4 introduce any change in the relative phase characteristics of their input signals, the change in relative phase will change the relationship between the outputs of subtractor 31 and adder 30.

In FIG. 3 the process of converting the amplitude monopulse antenna to a phase monopulse antenna is complete before amplification by IF amplifiers 13 and 18. At this stage of the circuit one is only interested in the amplitudes of the signals from subtractor 31 and adder 30; therefore the gain of IF amplifiers 13 and 18 must be equal. In other words the amplitudes of the outputs of subtractor 31 and adder 30 give the indication of the phase difference between their composite input signals. Thus, it should be apparent that the gain characteristics of the IF amplifiers is the important factor in FIG. 3 because they follow the second adder and subtractor and that in FIG. 4 the phase characteristics of the IF amplifiers is the important factor because they precede the second adder and subtractor.

I have not replaced the above-mentioned circuits with a block labeled "phase comparator" because many phase comparators include limiters which are not needed in my circuit.

Now that operation of the circuitry shown in FIG. 5 and how this operation relates to the circuits of FIGS. 3 and 4 has been described, the entire operation of the systems shown in FIGS. 3 and 4 can be more clearly described. In FIG. 3 echo signals impinge on the two feeds of antenna 27. Each of the feeds is connected to hybrid tee 26. Hybrid tee 26 performs the first sum and difference function. One of two outputs of hybrid tee 26 is coupled to the 90° phase shifter 29 through TR switch 16. The second output of the hybrid tee is coupled to mixed 17 through TR switch 28. The output from the 90° phase shifter is coupled to mixer 12. The RF input signals to mixers 12 and 17 are heterodyned with signals from local oscillator 15 to produce an IF output from the mixers.

Up to this point in the circuit the systems of FIGS. 3 and 4 are identical, and therefore, the operation thus far described applies to both systems.

In FIG. 3 the output of mixer 12 is applied to subtractor 31 and the output of mixer 17 is applied to adder 30. The output from adder 30 is amplified by IF amplifier 18 and then rectified by rectifier 19. The output from subtractor 31 is amplified by amplifier 13 and then rectified by rectifier 14. The outputs from rectifiers 14 and 19 are subtracted one from the other by subtractor 21 and the residue, if any, from subtractor 21 is applied, after rectification by full wave rectifier 22, to indicator 20.

In the system shown in FIG. 4 the second addition and subtraction is performed after the signals are amplified by IF amplifiers 13 and 18. As was mentioned above IF amplifiers 13 and 18 must be matched with regard to their phase characteristics if a proper response is to be obtained. The outputs from subtractor 31 and adder 30 are applied to rectifiers 14 and 19 respectively. The outputs from rectifiers 14 and 19 are subtracted, one from the other, by subtractor 21 and the residue from this subtraction process is applied by indicator 20 after rectification by full wave rectifier 22. Thus, the systems of FIGS. 3 and 4 are identical except for the location of subtractor 31 and adder 30; however, the location of these two elements is critical since the placement of these two elements determines how the IF amplifiers must be matched. The transmitter circuitry of FIGS. 3 and 4 is identical to that of FIG. 2.

While the fundamental features of my invention have been described with reference to three preferred embodiments of my invention it will be understood that various substitutions, omissions and changes in form may be made by those skilled in the art without departing from the scope of my invention. Therefore, it is my intention to be limited only as indicated by the scope of the following claims.

What is claimed is:

1. A radar receiver comprising: a first antenna; a second antenna vertically displaced from said first antenna; a first mixer coupled to said first antenna; a second mixer coupled to said second antenna; a local oscillator coupled to said first and second mixers; a first IF amplifier connected to said first mixer; a second IF amplifier connected to said second mixer; a first rectifier coupled to said first IF amplifier; a second rectifier coupled to said second IF amplifier; a subtractor circuit coupled to said first and second rectifiers; a third rectifier coupled to said subtractor; and an indicator coupled so said third rectifier.

2. A radar system comprising: a first antenna; a second antenna vertically displaced from said first antenna; an ATR switch coupled to said second antenna; a transmitter coupled to said ATR switch; a TR switch coupled to said second antenna; a first mixer coupled to said first antenna; a first IF amplifier coupled to said first mixer; a first rectifier coupled to said first IF amplifier; a second mixer coupled to said TR switch; a second IF amplifier coupled to said second mixer; a second rectifier coupled to said second IF amplifier; a local oscillator coupled to said first and second mixers; a subtractor circuit coupled to said first and second rectifiers; and a third rectifier coupled to said subtractor circuit.

3. A radar receiver comprising: an antenna having two vertically displaced feeds; a hybrid tee having a first input connected to one of said feeds, a second input connected to the other of said feeds, and two outputs; a 90° phase shifter coupled to one of said hybrid tee outputs; a first mixer coupled to said phase shifter; a second mixer coupled to the other of said hybrid tee outputs; a local oscillator coupled to said first and second mixers; a first subtractor coupled to said first and second mixers; an adder coupled to said first and second mixers; a first rectifier coupled to said first subtractor; a second rectifier coupled to said adder; and a second subtractor coupled to said first and second rectifiers.

4. A radar receiving comprising: an antenna having two vertically displaced feeds; a hybrid tee having a first input connected one of said feeds, a second input connected to the other of said feeds, and two outputs, a 90° shifter coupled to one of said hybrid tee outputs; a first mixer coupled to said phase shifter; a second mixer coupled to the other of said hybrid tee outputs; a local oscillator coupled to said first and second mixers; a first subtractor coupled to said first and second mixers; an adder coupled to said first and second mixers; a first IF amplifier coupled to said first subtractor; a second IF amplifier coupled to said adder; a first rectifier coupled to said first IF amplifier; a second rectifier coupled to said second IF amplifier; and a second subtractor coupled to said first and second rectifiers.

5. A radar receiver comprising: an antenna having two vertically displaced feeds; a hybrid tee having a first input connected one of said feeds, a second input connected to the other of said feeds, and two outputs, a 90° phase shifter coupled to one of said hybrid tee outputs; a first mixer coupled to said phase shifter; a second mixer coupled to the other of said hybrid tee outputs; a local oscillator coupled to said first and second mixers; a first subtractor coupled to said first and second mixers; an adder coupled to said first and second mixers; a first IF amplifier coupled to said first subtractor; a second IF amplifier coupled to said adder; a first rectifier coupled to said first IF amplifier; a second rectifier coupled to said second IF amplifier; a second subtractor connected to said first and second rectifiers a third rectifier coupled to said second subtractor; and an indicator connected to said third rectifier.

6. A radar receiver comprising: an antenna having two vertically displaced feeds; a hybrid tee having a first input connected to one of said feeds, a second input connected to the other of said feeds; and two outputs; a 90° phase shifter coupled to one of said hybrid tee outputs; a first mixer coupled to said phase shifter; a second mixer coupled to the other of said hybrid tee outputs; a local oscillator coupled to said first and second mixers; a first IF amplifier coupled to said first mixer; a second IF amplifier coupled to said second mixer; a first subtractor coupled to said first and second IF amplifiers; an adder coupled to said first and second IF amplifiers; a first rectifier coupled to said first subtractor; a second rectifier coupled to said adder; and a second subtractor coupled to said first and second rectifiers.

7. A radar receiver comprising: an antenna having two vertically displaced feeds; a hybrid tee having a first input connected to one of said feeds, a second input connected to the other of said feeds, and two outputs; a 90° phase shifter coupled to one of said hybrid tee outputs; a first mixer coupled to said phase shifter; a second mixer coupled to the other of said hybrid tee outputs; a local oscillator coupled to said first and second mixers; a first IF amplifier coupled to said first mixer; a second IF amplifier coupled to said second mixer; a first subtractor coupled to said first and second IF amplifiers; an adder coupled to said first and second IF amplifiers; a first rectifier coupled to said first subtractor; a second rectifier coupled to said adder; a second subtractor connected to said first and second rectifiers a third rectifier coupled to said second subtractor; and an indicator coupled to said third rectifier.

8. A radar system comprising: an antenna having two vertically displaced feeds; a hybrid tee having two inputs and two outputs; means to connect one of said antenna feeds to one of said hybrid tee inputs; means to connect the other of said antenna feeds to the other of said hybrid tee inputs; a first TR switch connected to one of said hybrid tee outputs; a second TR switch connected to the other of said hybrid tee outputs; an ATR switch connected to the other of said hybrid tee outputs; a transmitter connected to said ATR switch; a 90° phase shifter connected to said first TR switch; a first mixer connected to said phase shifter; a second mixer connected to said second TR switch; a local oscillator connected to said first and second mixers; a first subtractor connected to said first and second mixers; an adder connected to said first and second mixers; a first IF amplifier connected to said first subtractor; a second IF amplifier connected to said adder; a first rectifier connected to said first IF amplifier; a second rectifier connected to said second IF amplifier; a second subtractor connected to said first and second rectifiers; a third rectifier connected to said second subtractor; and an indicator connected to said third rectifier.

9. A radar system comprising: an antenna having two vertically displaced feeds; a hybrid tee having two inputs and two outputs; means to connect one of said antenna feeds to one of said hybrid tee inputs; means to connect the other of said antenna feeds to the other of said hybrid tee inputs; a first TR switch connected to the other of said hybrid tee outputs; a second TR switch connected to the other of said hybrid tee outputs; an ATR switch connected to the other of said hybrid tee outputs; a transmitter connected to said ATR switch; a 90° phase shifter connected to said first TR switch; a first mixer connected to said phase shifter; a second mixer connected to said second TR switch; a local oscillator connected to said first and second mixers; a first IF amplifier connected to said first mixer; a second IF amplifier connected to said second mixer; a first subtractor connected to said first and second IF amplifiers; an adder connected to said first and second IF amplifiers; a first rectifier connected to said first subtractor; a second rectifier connected to said adder; a second subtractor connected to said first and second rectifiers; a third rectifier connected to said second subtractor; and an indicator connected to said third rectifier.

* * * * *